UNITED STATES PATENT OFFICE.

ROBERT O. LOWREY, OF SALEM, NEW YORK.

IMPROVED MODE OF TREATING LEATHER, CLOTH, AND THE LIKE, TO RENDER THEM WATER AND FIRE PROOF.

Specification forming part of Letters Patent No. 77,990, dated May 19, 1868; antedated May 12, 1868.

*To all whom it may concern:*

Be it known that I, ROBERT O. LOWREY, of Salem, in the county of Washington and State of New York, have invented certain new and useful Improvements in Rendering Fabrics Water-Proof; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel manner of treating leather, and fabrics of all kinds, to render them water-proof, the object being to accomplish this result without closing the pores of the fabric or material.

To accomplish this object I first prepare a solution as follows: Of gelatine or animal glue, or their known substitutes, I take in the proportion of four ounces; of soap or similar extractive matter, two ounces; of glycerine or saccharine matter, or of the two combined, two ounces, and dissolve in from two to four quarts of water.

In practice, I prefer to dissolve the gelatinous material in about one-half of the water, and in the remainder dissolve the soapy matter separately. The glycerine and saccharine matter, or either of them, if but one be used, may be added to either of these solutions before they are united, or may be added to them after they have been mixed together. The two solutions I prefer to mix when warmed or heated, as their union is thus rendered more perfect, though it is not absolutely essential. This I denominate solution No. 1.

Next, I prepare an astringent solution, consisting, preferably, of about equal parts of alum and salt, dissolved in water, as much of these ingredients being added as the water, at a temperature of 60° to 65° of Fahrenheit, will hold in solution. This I denominate solution No. 2.

I then take the fabric, which may be of any kind, and immerse it in the solution No. 1 until it becomes saturated; or the solution may be applied by means of a brush or in any other manner. It is then dried or pressed, and afterward treated with solution No. 2, either by immersing the fabric in the solution, or by applying the solution in any other convenient manner to the fabric.

After this, the fabric is washed or rinsed, and dried, when it will be found to be water-proof, although the pores are not filled up or closed.

The foregoing is the method that I prefer as being the best; but in my experiments I have found that the same results may be produced, varying only in degree, by substituting for the gelatinous matter, gum-arabic or gum-senegal, dextrine, caseine, albumen, gluten, or starch, or an admixture of any two or more of these. So, also, instead of the astringent solution composed of alum and salt, as previously described, the following may be substituted, viz: tannin, tannic acid, catechu, or any material containing tannin, gallic acid, boracic acid, alum alone or combined with borax, or chrome alum, or any of the salts of sesquioxide of chromium; or chloride of sodium alone may be used; or any two or more of these ingredients may be combined and used; but, as before stated, I prefer to use the solution of alum and salt, as being simpler and more satisfactory in its results.

It is desirable to apply the solutions warm or heated, as their action is then more rapid and thorough.

By these means I am enabled to render fabrics of all kinds, whether of cotton, wool, silk, or leather, or a mixture of either two or all, and whether woven, knitted, or filleted.

In case it be desired to render the article more soft and pliable, then the proportion of glycerine or saccharine matter, or of both, should be increased; and if it be desired to impart to it a more smooth and slippery quality, to prevent chafing from friction or rubbing, then the soapy compound or matter should be increased.

Fabrics thus treated may also be rendered fire-proof by adding to the solutions, or either of them, the proper quantity of sulphate or phosphate of ammonia, or tungstate of soda and phosphate of soda combined, or phosphate of soda and borax, or the sulphate, carbonate, or chloride of magnesia, or any equivalent material for producing that result.

Having thus described my invention, what I claim is—

The treating of fabrics, substantially as herein described, for the purpose of rendering them water-proof, either with or without the addition of the fireproofing ingredients.

R. O. LOWREY.

Witnesses:
W. C. DODGE,
H. B. MUNN.